United States Patent [19]

Bauer et al.

[11] Patent Number: 4,797,269

[45] Date of Patent: Jan. 10, 1989

[54] PRODUCTION OF BETA ALUMINA BY SEEDING AND BETA ALUMINA PRODUCED THEREBY

[75] Inventors: Ralph Bauer, Niagara Falls, Canada; Rufus M. Franklin, Holden, Mass.

[73] Assignee: Norton Company, Worcester, Mass.

[21] Appl. No.: 153,676

[22] Filed: Feb. 8, 1988

[51] Int. Cl.[4] ................................................. C01F 7/04
[52] U.S. Cl. .................................... 423/600; 423/266; 423/625; 501/118; 501/125; 501/153
[58] Field of Search ............... 423/600, 625, 626, 631; 501/153, 118, 125

[56] References Cited

U.S. PATENT DOCUMENTS

| H 189 | 1/1987 | Bauer | 423/626 |
|---|---|---|---|
| 3,859,427 | 1/1975 | Francis et al. | 423/600 |
| 3,917,462 | 11/1975 | Yancey | 423/600 |
| 4,013,477 | 3/1977 | Jatkar et al. | 501/153 |
| 4,339,511 | 7/1982 | Morgan | 501/135 |
| 4,543,107 | 9/1985 | Rue | 51/309 |
| 4,615,875 | 10/1986 | Gonczy et al. | 423/627 |
| 4,623,364 | 11/1986 | Cottringer et al. | 51/293 |
| 4,657,754 | 4/1987 | Bauer et al. | 423/625 |

OTHER PUBLICATIONS

Dynys et al; vol. 65, No. 9, Journal of American Ceramic Society, 9-1982, pp. 442-448.

*Primary Examiner*—John Doll
*Assistant Examiner*—Paige C. Harvey
*Attorney, Agent, or Firm*—Arthur A. Loiselle, Jr.

[57] ABSTRACT

Seeding of beta type alumina compositions in which the alumina in the raw batch is microcrystalline boehmite results in significant increase in hardness, density and strength, as compared to unseeded beta alumina, when fired under similar conditions.

8 Claims, No Drawings

PRODUCTION OF BETA ALUMINA BY SEEDING AND BETA ALUMINA PRODUCED THEREBY

This invention relates to the manufacture of beta type aluminas for use as solid electrolyte conductors of small ions. Such materials are used as electrodes in fuel cells and in cells for electrical power generation such as sodium-sulfur cells.

BACKGROUND OF THE INVENTION

Beta type aluminas are crystalline materials of the formula $Na_2O-11Al_2O_3$ or $Na_2O-6Al_2O_3$ where the Na may be substituted in whole or in part by other alkali or alkaline earth elements. In the sodium sulfur cell the beta alumina electrode forms a barrier between molten sulfur and molten sodium. The electrode permits the flow through it of sodium ions, whereby $Na_2S$ is formed, generating power when a load is applied to output electrodes in contact with opposite sides of the cell.

It is desirable that the beta alumina for application on a solid electrolyte be strong and dense. In the past such products have been formed by classical sintering techniques where powder of the desired beta alumina composition is compacted into the desired shape by molding and then fired to produce the final product.

The present invention provides a method by which bodies of superior strength and low porosity can be made.

BRIEF DESCRIPTION OF THE INVENTION

Beta alumina bodies of superior hardness (density) and strength are produced in the present invention by providing a mix, containing an alumina sol or gel together with the stoichiometric amounts of alkali and/or alkaline earth oxides or oxide precursors. Seed particles for nucleation of the beta alumina are added, and the composition is formed to shape in the gel form by molding, casting, or extruding. In a sol form, water is removed from the mix to produce the desired consistency for the forming step. If the material is to be cast, a higher water content will be desirable than in the case where it is to be extruded. Seeds for nucleation of the beta alumina may be beta alumina itself, or preferably, may be alpha alumina, since alpha alumina is readily ground into appropriate size for use as seed material, and, for reasons not clearly understood at this time, is an effective nucleant for the growth of beta alumina crystals. One possibility is that the surface of the alpha seed reacts with the alkali or alkaline earth components in the mix to form beta alumina prior to that point in the firing of the shaped body at which any significant autogenous nucleation of the composition to beta alumina takes place. Thus the nucleation takes place in a controlled and uniform manner.

When beta alumina seed is employed it is not necessary that it be of the same composition, in terms of alkali or alkaline earth ions as the overall composition. Thus a lithium beta alumina can act as a seed for a potassium or sodium beta composition.

U.S. Pat. No. 4,623,364 to Cottringer, Van de Merwe, and Bauer, teaches various methods of producing fine alpha alumina seed to be used in the manufacture of alpha alumina bodies. Such seed is the preferred seed in the present invention. However it is produced, it should be finer than one micron in size and preferably much finer. Typical preferred seed has a surface area of about 40 square meters per gram, equivalent to a particle diameter of 0.04 microns (micrometers).

DESCRIPTION OF PREFERRED EMBODIMENTS AND COMPARATIVE EXAMPLE

An arbitrary composition of $1.0\ Na_2O-0.1-6Li_2O-6.33\ Al_2O_3$ was chosen to illustrate the invention.

In a large stainless steel vessel was put condea NG microcrystalline boehmite in the amount of 215 grams. In a separate 400 ml beaker 26.5 grams of anhydrous sodium carbonate was dissolved in 100 ml of water and 30 ml of concentrate (14% $HNO_3$) nitric acid which was slowly added. In another container 3.0 grams of lithium carbonate was dissolved in 50 ml of water and 7 ml of concentrated nitric acid (slowly added).

To the stainless steel vessel containing the microcrystalline boehmite were added 1.5 liters of water and all the sodium and lithium solutions. The mixture was stirred and an additional 100 ml of concentrated nitric acid was added. The mixture was thoroughly stirred and then separated into two portions.

The first half was dried in the form of a plate and broken into several pieces.

Prior to drying the second half was seeded by the addition of 13 grams of water which had been milled in a vibratory mill with $\frac{1}{2}" \times \frac{1}{2}"$ alumina grinding cylinders until it contained 6.33% of fine solids from the alumina media.

The gel was then dried as a flat plate and broken into several pieces.

The following results were obtained upon firing the samples for 4 minutes:

| Firing Temperature | Hardness in GPa | |
| --- | --- | --- |
| | Seeded | Not Seeded |
| 1300 | 7.9 | 4 |
| 1400 | 8 | 4.6 |
| 1500 | 7.7 | 5 |

All of the samples were shown to be beta (beta double primed) by X-ray diffraction.

The results show a very significant increase in hardness and strength and density for the seeded samples.

What is claimed is:

1. A method of making a beta alumina body, comprising:
   (a) providing a composition consistent with the formation of beta alumina upon firing, said composition comprising (i) an alumina sol or gel, (ii) a material selected from the group consisting of oxides and precursors of oxides of sodium, potassium, lithium, magnesium, and calcium, and (iii) submicron seed particles selected from the group consisting of beta alumina and alpha alumina, said seed particles being present in an amount of at least 0.1% by weight of the final solids content of said body;
   (b) shaping said gel or sol;
   (c) drying the shaped gel sol from step (b); and
   (d) firing the dried shaped gel from step (c) at a temperature of from 1200° C. to 1500° C. to produce said beta alumina body, said seed particles being present in said gel or sol in an amount at least equivalent to $10^6$ particles per cubic centimeter of said beta alumina body.

2. A method as in claim 1 in which the seed material is alpha alumina.

3. A method as in claim 2 in which the alpha alumina seed has a surface area of 40 square meters per gram or greater.

4. A method as in claim 1 in which the seed material is produced by wet grinding an alumina-grinding media.

5. A method as in claim 4 in which said alumina sol or gel consists essentially of microcrystalline boehmite gel.

6. A method as in claim 3 in which said alumina sol or gel consists essentially of microcrystalline boehmite gel.

7. A method as in claim 2 in which said alumina sol or gel consists essentially of microcrystalline boehmite gel.

8. A method as in claim 1 in which said alumina sol or gel consists essentially of microcrystalline boehmite gel.

* * * * *